(12) United States Patent  
Jung (10) Patent No.: US 11,804,228 B2  
(45) Date of Patent: Oct. 31, 2023

(54) PHONEME-BASED SPEAKER MODEL ADAPTATION METHOD AND DEVICE

(71) Applicant: SAMSUNG ELECTRONICS CO., LTD., Suwon-si (KR)

(72) Inventor: Chisang Jung, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 359 days.

(21) Appl. No.: 17/273,542

(22) PCT Filed: Aug. 9, 2019

(86) PCT No.: PCT/KR2019/010032  
§ 371 (c)(1),  
(2) Date: Mar. 4, 2021

(87) PCT Pub. No.: WO2020/054980  
PCT Pub. Date: Mar. 19, 2020

(65) Prior Publication Data  
US 2021/0193153 A1 Jun. 24, 2021

(30) Foreign Application Priority Data  
Sep. 10, 2018 (KR) .................. 10-2018-0107999

(51) Int. Cl.  
*G10L 17/08* (2013.01)  
*G10L 17/02* (2013.01)  
(Continued)

(52) U.S. Cl.  
CPC .............. *G10L 17/08* (2013.01); *G10L 15/02* (2013.01); *G10L 15/26* (2013.01); *G10L 17/02* (2013.01);  
(Continued)

(58) Field of Classification Search  
CPC ......... G10L 17/08; G10L 15/02; G10L 15/26; G10L 17/02; G10L 17/04; G10L 15/04; G10L 2015/025  
(Continued)

(56) References Cited

U.S. PATENT DOCUMENTS 6,272,463 B1 * 8/2001 Lapere .................. G10L 15/065  
704/E15.013  
7,171,360 B2 * 1/2007 Huang .................... G10L 15/07  
704/239  
(Continued)

FOREIGN PATENT DOCUMENTS

CN 107358945 11/2017  
CN 107480152 12/2017  
(Continued)

OTHER PUBLICATIONS

International Search Report for PCT/KR2019/010032 dated Nov. 18, 2019, 2 pages.  
(Continued)

*Primary Examiner* — Edwin S Leland, III  
(74) *Attorney, Agent, or Firm* — Nixon & Vanderhye, P.C.

(57) ABSTRACT

The present disclosure relates to a speaker model adaptation method and device for enhancing text-independent speaker recognition performance. Specifically, the disclosure relates to a method and a device whereby, for the adaption of a speaker model pre-stored in an electronic device, text-independent speaker recognition performance is improved by considering variations in the amount of speaker characteristics information per phoneme unit.

15 Claims, 7 Drawing Sheets

(51) Int. Cl.
*G10L 17/04* (2013.01)
*G10L 15/02* (2006.01)
*G10L 15/26* (2006.01)
*G10L 15/04* (2013.01)

(52) U.S. Cl.
CPC .............. *G10L 17/04* (2013.01); *G10L 15/04* (2013.01); *G10L 2015/025* (2013.01)

(58) Field of Classification Search
USPC ........................................................ 704/235
See application file for complete search history.

(56) References Cited

U.S. PATENT DOCUMENTS

| | | | |
|---|---|---|---|
| 8,155,961 | B2 | 4/2012 | Tian |
| 9,536,525 | B2* | 1/2017 | Hayakawa .............. G10L 17/04 |
| 10,733,978 | B2 | 8/2020 | Subhojit |
| 2003/0088414 | A1* | 5/2003 | Huang .................... G10L 15/07 704/E15.011 |
| 2010/0145699 | A1 | 6/2010 | Tian |
| 2012/0239400 | A1* | 9/2012 | Koshinaka ............. G10L 17/16 704/E17.004 |
| 2016/0232893 | A1 | 8/2016 | Subhojit |
| 2018/0366124 | A1* | 12/2018 | Cilingir ................... G10L 17/04 |
| 2019/0005944 | A1 | 1/2019 | Subhojit |
| 2019/0080697 | A1* | 3/2019 | Grancharov ............ G10L 15/26 |
| 2019/0206409 | A1* | 7/2019 | Jung ....................... G10L 17/06 |
| 2019/0378533 | A1* | 12/2019 | Chao ....................... G10L 17/02 |
| 2021/0183392 | A1* | 6/2021 | Lee .......................... G10L 15/26 |
| 2021/0193153 | A1* | 6/2021 | Jung ....................... G10L 17/02 |

FOREIGN PATENT DOCUMENTS

| | | | |
|---|---|---|---|
| CN | 113053353 A * | 6/2021 | ............ G10L 13/02 |
| KR | 10-2006-0062287 | 6/2006 | |
| KR | 10-0586045 | 6/2006 | |
| KR | 10-2011-0010243 | 2/2011 | |
| KR | 10-2011-0100642 | 9/2011 | |
| KR | 10-2012-0031548 | 4/2012 | |
| KR | 10-1547261 | 8/2015 | |
| KR | 10-2016-0047834 | 5/2016 | |
| KR | 10-1618512 | 5/2016 | |
| KR | 10-2016-0098771 | 8/2016 | |
| WO | WO-2020054980 A1 * | 3/2020 | ............ G10L 15/02 |

OTHER PUBLICATIONS

Written Opinion of the ISA for PCT/KR2019/010032 dated Nov. 18, 2019, 4 pages, with English Translation.
Nishida et al., "Speaker model selection based on the Bayesian information criterion applied to unsupervised speaker indexing", *ResearchGate*, IEEE Transactions on Speech and Audio Processing, vol. 13, No. 4, Jul. 2005, 12 pages.
Office Action dated May 16, 2023 in Korean Patent Application No. 10-2018-0107999 and English-language translation.
Office Action dated Jul. 31, 2023 in Korean Patent Application No. 10-2018-0107999 and English-language translation.

* cited by examiner

PHONEME-BASED SPEAKER MODEL ADAPTATION METHOD AND DEVICE

This application is the U.S. national phase of International Application No. PCT/KR2019/010032 filed Aug. 9, 2019 which designated the U.S. and claims priority to KR Patent Application No. 10-2018-0107999 filed Sep. 10, 2018, the entire contents of each of which are hereby incorporated by reference.

TECHNICAL FIELD

The disclosure relates to a speaker model adaptation method and a device for improving the performance of text-independent speaker recognition. Specifically, the disclosure relates to a method and a device for improving the performance of a text-independent speaker recognition in consideration of a change in amount of speaker characteristics information in a phoneme unit in the adaptation of a speaker model previously stored in an electronic device.

BACKGROUND ART

The text-independent speaker recognition is a technology that is capable of recognize a speaker through any speech, instead of not being limited to a particular text. If a user registers the user's voice through as many speeches as possible, including a variety of contents of speeches, excellent text-independent speaker recognition performance may be secured. For securing performance, however, speaker recognition for several minutes may be required, which causes fall in usability of a user. In order to overcome the above problem, a short speaker registration speech may be used to improve efficiency of a speaker registration step, but in this case, an initial registration speech may be short and a registration model may not sufficiently include the speaker information included in all phonemes, and the speaker recognition performance may fall.

As another way to overcome the above problem, a method for enhancing a speaker model through real speech used for a speech service may be proposed. A method for performing an initial speaker registration and measuring the similarity with the speaker model when the user uses the speech service may be used to adapt/enhance the speaker model. The related-art speaker model adaptation method may use all the input speeches to the speaker model adaptation training when a probability that a real speech is of a specific speaker (the speaker recognition similarity) is high. However, the method may have the following problems.

In the related art, the real data for speaker model adaptation may not consider the balanced distribution of the phoneme, and may not include all of the speaker characteristics of each phoneme. There may be a problem in that similarity may be measured depending only on the speaker characteristics based on the phoneme that the current speaker model includes, and subordinating to local-maximum of the speaker characteristic information according to the phoneme distribution of the initial speaker model. Due to the dependent update process for the specific phoneme group, there may be a disadvantage in that it is difficult to secure the speaker recognition performance for various free speeches.

DISCLOSURE

Technical Problem

As described above, related-art methods may use speaker model adaptation methods dependent on the speaker characteristics information of an initially-registered speech. An object of the disclosure is to improve the performance of the text-independent speaker recognition by efficiently using the speaker model adaptive training while maintaining the usability to simplify a speaker registration in using the text-independent speaker recognition service.

The disclosure provides a speaker model adaptation method in consideration of a change in an amount of speaker characteristics information in a phoneme unit issued in adapting a speaker model so as to overcome a limitation of speaker characteristics information of an initially registered speech and improve performance of the text-independent speaker recognition.

Technical Solution

According to an embodiment, a method of controlling an electronic device includes receiving a speech signal from a user, identifying a speaker model corresponding to the speech signal among a plurality of speaker models, determining changes in an amount of speaker characteristics information of the speaker model based on each of the phonemes being inputted in the identified speaker model for each of a plurality of phonemes included in the speech signal, and training the identified speaker model using at least one of the plurality of phonemes based on the result of determining.

The training may further include, based on a phoneme being inputted to the identified speaker model among the plurality of phonemes, identifying a phoneme that increases the amount of speaker characteristics information of the speaker model to the maximum, and training the identified speaker model using the identified phoneme.

The training may further include, based on a phoneme being inputted to the identified speaker model among the plurality of phonemes, identifying at least one phoneme that increases the amount of speaker characteristics information of the speaker model by a preset criterion or more, and training the identified speaker model using the at least one identified phoneme.

The determining changes of information relative to the speaker model may further include obtaining text data corresponding to the speech signal and identifying the phoneme included in the speech signal by performing grapheme-to-phoneme conversion and a phoneme section segmentation based on the text data.

The determining the changes may include, based on the information on the identified phoneme being included in the speaker model, determining an index (indicator) for the identified phoneme by reducing an entropy value for the amount of speaker characteristics information included in the speaker model, an entropy value for the amount of speaker characteristics information for the phoneme included in the speaker model, and an entropy value for overlapped information amount of the phoneme, from an entropy value for the amount of speaker characteristics information when the speaker model is trained with obtained phoneme, and based on the information about the identified phoneme not included in the speaker model, determining an index for the identified phoneme by reducing an entropy value for the amount of speaker characteristics information included in the speaker model from the entropy value for the amount of speaker characteristics information when the speaker model is trained with the identified phoneme.

The index may be a Bayesian information criterion (BIC) for the amount of speaker characteristics information modeled using a Gaussian model.

The receiving may include receiving a plurality of speech signals from a plurality of users, and the identifying the speaker model may further include identifying a speech signal of which an accumulated signal length exceeds a preset reference length after being inputted, from among the plurality of speech signals, and wherein the identifying comprises identifying a speaker model corresponding to the identified speech signal.

The identifying the speaker model may include identifying a speaker model of which a similarity with the input speech signal exceeds a preset similarity, among the plurality of speaker models.

According to an embodiment to address the aforementioned task, an electronic device according to an embodiment may include, a microphone and a processor configured to identify a speaker model corresponding to a speech signal inputted through the microphone among a plurality of speaker models, determine changes in an amount of speaker characteristics information of the speaker model based on each of the phonemes being inputted in the identified speaker model for each of a plurality of phonemes included in the speech signal, and train the identified speaker model using at least one of the plurality of phonemes based on the result of determining.

The processor may, based on a phoneme being inputted to the identified speaker model among the plurality of phonemes, identify a phoneme that increases the amount of speaker characteristics information of the speaker model to the maximum and train the identified speaker model using the identified phoneme.

The processor may, based on a phoneme being inputted to the identified speaker model among the plurality of phonemes, identify at least one phoneme that increases the amount of speaker characteristics information of the speaker model by a preset criterion or more, and train the identified speaker model using the at least one identified phoneme.

The processor may obtain text data corresponding to the speech signal and identify the phoneme included in the speech signal by performing grapheme-to-phoneme conversion and a phoneme section segmentation based on the text data.

The processor may, based on the information on the identified phoneme being included in the speaker model, determine an index for the identified phoneme by reducing an entropy value for the amount of speaker characteristics information included in the speaker model, an entropy value for the amount of speaker characteristics information for the phoneme included in the speaker model, and an entropy value for overlapped information amount of the phoneme, from an entropy value for the amount of speaker characteristics information when the speaker model is trained with obtained phoneme, and based on the information about the identified phoneme not included in the speaker model, determine an index for the identified phoneme by reducing an entropy value for the amount of speaker characteristics information included in the speaker model from the entropy value for the amount of speaker characteristics information when the speaker model is trained with the identified phoneme.

The index may be a Bayesian information criterion (BIC) for the amount of speaker characteristics information modeled using a Gaussian model.

The processor may identify a speech signal of which an accumulated signal length exceeds a preset reference length after being inputted, from among the plurality of speech signals, and identify a speaker model corresponding to the identified speech signal.

The processor may identify a speaker model of which a similarity with the input speech signal exceeds a preset similarity, among the plurality of speaker models.

Effect of Invention

According to various embodiments as described above, optimization data for speaker model adaptation may be selected by using the amount of change of the speaker characteristic information for each phoneme for enhancement of speaker recognition performance After measuring the amount of change of the speaker characteristic information of each of the phoneme relative to the data passing through the speaker model similarity measurement criterion, the optimal data capable of maximizing the speaker characteristic information may be selected. Through this, the registration usability of the text-independent speaker recognition may be secured, and the speaker information may be maximized from the user's real speech without being dependent on the characteristics of the initial registration model attributable to the limited amount of data. As the user uses a speech service more, the performance of the text-independent speaker recognition may be enhanced efficiently.

BEST MODE FOR CARRYING OUT THE INVENTION

The disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In addition, expressions "first", "second", or the like, used in the disclosure may indicate various components regardless of a sequence and/or importance of the components, will be used only in order to distinguish one component from the other components, and do not limit the corresponding components. For example, the first user device and the second user device may represent different user devices regardless of an order or importance. For example, the first component may be termed a second component without departing from the scope of the rights described in this disclosure, and similarly the second component may be termed a first component.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

Figure 1:
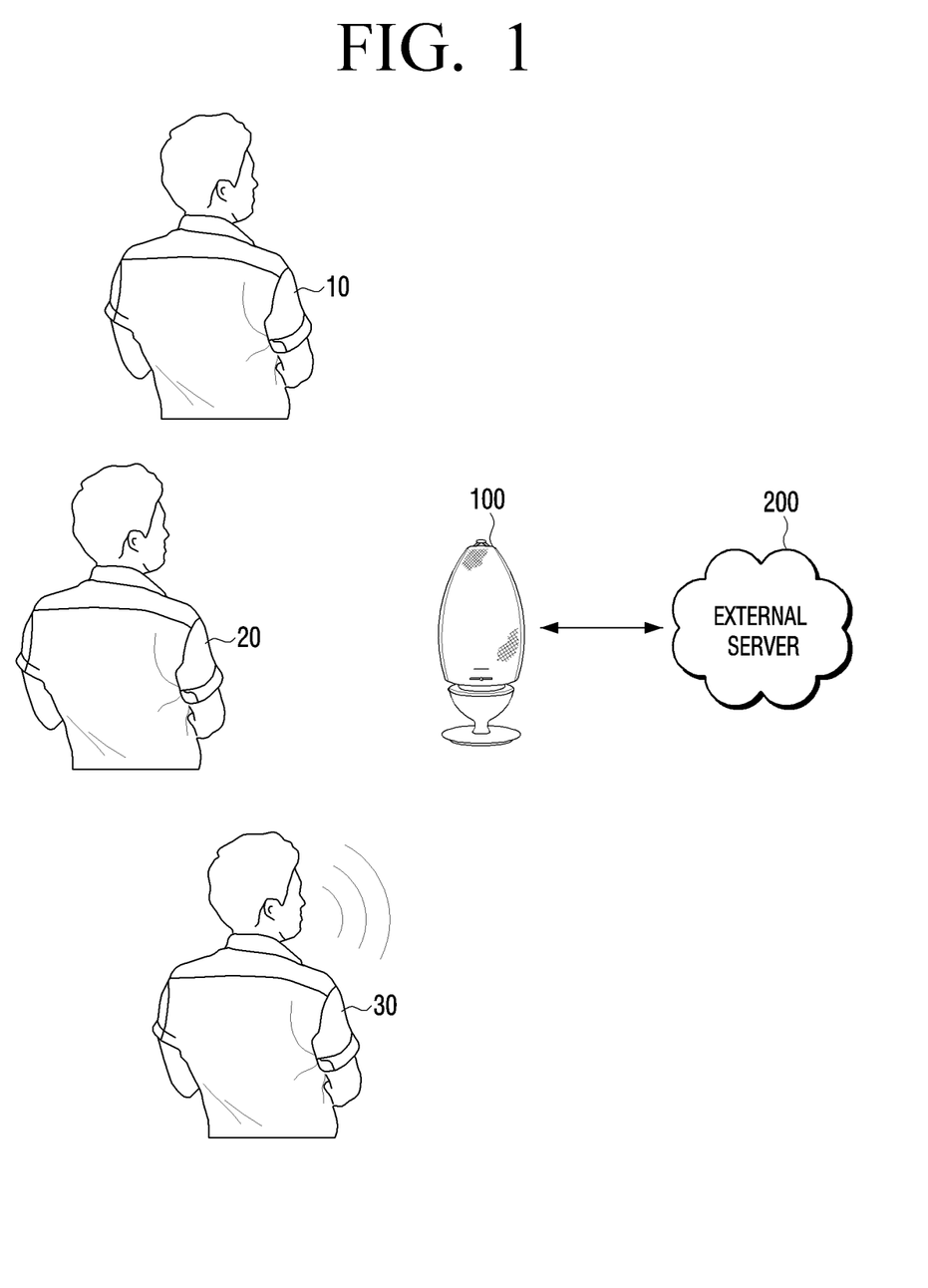
FIG. 1 is a diagram illustrating a speech recognition environment of an electronic device used by a plurality of users according to an embodiment.

Various embodiments will be described in detail with reference to the accompanying drawings. FIG. 1 is a diagram illustrating a speech recognition environment of an electronic device used by a plurality of users according to an embodiment.

Referring to FIG. 1, an electronic device 100 may receive speech from a plurality of speakers 10, 20, 30. The electronic device 100 may be implemented as an electronic device capable of receiving a speech signal by a plurality of users, such as an artificial intelligence (AI) speaker. This is only one embodiment, and the electronic device 100 of the disclosure may be implemented through various electronic devices such as a smart television (TV) having a microphone for receiving a user's speech signal.

The electronic device 100 may store a speaker model corresponding to a plurality of speakers 10, 20, 30. The electronic device 100 may perform registration for speaker recognition by a plurality of speakers 10, 20, 30 before or during use. In other words, the electronic device 100 may receive a speech signal through various methods, such as reading a specific text, and register a plurality of speaker models based on obtained phoneme information in order to obtain phoneme information for speech recognition from each of the plurality of speakers. The phoneme may refer to a minimum unit of speech which distinguishes words to divide semantics. For example, in Korean words "살" and "쌀", first sound /ㅅ/ and /ㅆ/, and vowels /ㅗ/ and /ㅏ/ in "손" and "산" are phonemes having a distinguishing function that may distinguish semantics of two words.

The electronic device 100 may store a speaker model corresponding to a plurality of speakers 10, 20, 30. The speaker model may include speaker characteristic information for each speaker. The speaker characteristic information may include information on the body characteristic information of the speaker, such as the mouth structure, the length of the neck, or the like, and the pronunciation characteristic information of the speaker, such as the pronunciation habits for a specific phoneme. The embodiment is not limited thereto, and the speaker model may include frequency information corresponding to the speaker's speech signal, in addition to the speaker characteristic information.

The above-described speaker characteristics information may be obtained by analyzing the phoneme information obtained through the input speech signal. The electronic device 100 may obtain speaker characteristics information by inputting the obtained phoneme information to the artificial intelligence model trained to output speaker characteristics information.

The artificial intelligence model may be included in the electronic device 100 and may be included in an external server 200. When the artificial intelligence model is included in the external server 200, the electronic device 100 may convert the received speech signal to a digital signal through an analogue to digital converter (ADC) and transmit the converted speech signal to the external server 200. The external server 200 may obtain the speaker characteristics information including the specific information on the speaker's body and the pronunciation characteristic information based on the signal for the received speech. The electronic device 100 may receive data for the speaker characteristics information obtained by the external server 200. The electronic device 100 may correspond the obtained speaker characteristics information to each speaker model and store the same.

When a particular speaker 30 speeches as in FIG. 1, the electronic device 100 may identify a speaker model corresponding to the corresponding speaker 30 among a plurality of pre-stored speaker models. A method for identifying a speaker model may be to identify a speaker model having a high similarity among a plurality of speaker models by comparing the frequency information corresponding to the speech signal, the speaker characteristics information and frequency information included in the speaker model.

After identifying the speaker model corresponding to the speaker 30, the electronic device 100 may receive the real speech continuously inputted from the speaker 30. The electronic device 100 may obtain the phoneme included in the inputted real speech. The electronic device 100 may obtain a phoneme by performing an STT process, a grapheme-to-phoneme conversion, and a phoneme section classification, or the like. The detail will be described later.

The process such as the STT process, a grapheme-to-phoneme conversion, and a phoneme section classification may be performed on the external server 200 other than the electronic device 100. The electronic device 100 may transmit the digital conversion data for the inputted speech to the external server 200 and may receive the phoneme information for the recognized speech from the external server 200. The server performing speech recognition and the grapheme-to-phoneme conversion server may be implemented with the same external server 200 or may be implemented as a separate server.

The electronic device 100 may identify the change in the amount of speaker characteristics information included in the existing speaker model when each newly obtained phoneme is input to an existing speaker model. The increase of the amount of speaker characteristics information may be to obtain information on new body information of the speaker body information included in the speaker characteristics information, for example, the oral structure, and obtain information to further specify the structure of the body characteristic information, for example, a back of the head, which has already been included.

The increase of the amount of speaker characteristics information may be to obtain information on the speaker pronunciation information included in the speaker characteristics information, for example, the speaker's pronunciation of a new phoneme, and obtain information that the user's pronunciation of a particular phoneme is different when the particular phoneme included in the existing speaker model and subsequent another phoneme are pronounced.

The electronic device 100 may identify whether new speaker characteristic information not included in the existing speaker model may be obtained as a result of a combination of a newly obtained phoneme and a phoneme included in the speaker model. For example, by analyzing the frequency information of a speech signal including the phoneme /ㄱ/, the existing speaker model may include a pronunciation habit when the speaker is pronounces /ㄱ/. If the newly-obtained speech signal includes a speech signal pronouncing /ㅏ/ phoneme after the phoneme /ㄱ/, the electronic device 100 may identify if there is a difference between a signal characteristic of pronouncing the phoneme /ㄱ/ and the phoneme /ㅏ/ successively, and a signal characteristic of pronouncing /ㄱ/ only. As a result of identification, if a new pronunciation habit of a speaker is added for the phoneme /ㄱ/, the electronic device 100 may identify that the amount of speaker characteristics information which the speaker model includes increases.

The electronic device 100 may train or adapt the speaker model using the phoneme when it is identified that the newly obtained phoneme increases the amount of speaker characteristic information with respect to the existing speaker model.

As described above, by training a speaker model based on the amount of speaker characteristics information included in an existing speaker model, problems of subordinating to a local-maximum, such as related-art technology, may be prevented. The related-art technology has been trained in a direction where the recognition rate for the phonemes included in the existing speaker model registration is enhanced. However, according to the disclosure, there may be an effect of aiming the global-maximum by training the speaker model based on the amount of speaker characteristics information regardless whether the phoneme is already included.

If the electronic device 100 is implemented with an electronic device, in which an application is installable, such as a smartphone, smart TV, smart remote controller, or the like, the electronic device 100 may drive an application to control the external device to perform a function corresponding to the recognized speech signal. The application may be present on the electronic device 100 from the beginning of release.

For example, the user 30 may drive an application within the electronic device 100 to input a speech command, such as a "please turn on A movie". The electronic device 100 may recognize a speech command inputted from the user 30 among a plurality of audio signals and may transmit a control signal to perform a function corresponding to a speech command to an external device capable of outputting image content connected to the electronic device 100.

Although not shown in FIG. 1, the electronic device 100 may receive a speech signal received not only through a microphone in the electronic device 100, but also through a microphone included in an external device connected to the electronic device 100. The external device connected to the electronic device 100 may be a remote controller including a microphone, but is not limited thereto.

Figure 2:
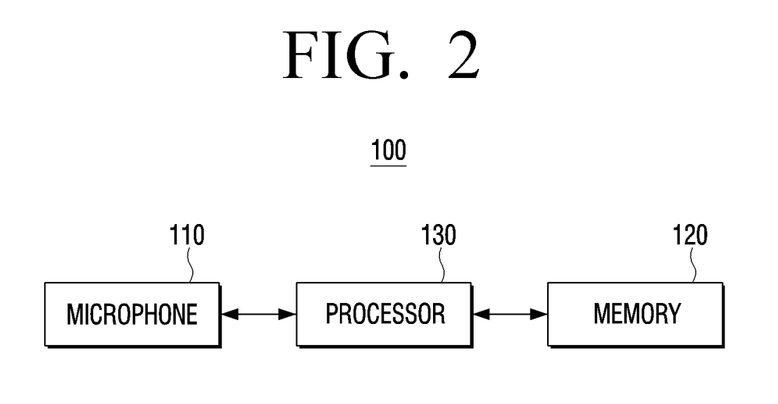
FIG. 2 is a simple block diagram illustrating a component of an electronic device according to an embodiment.

FIG. 2 is a simple block diagram illustrating a component of an electronic device according to an embodiment. Referring to FIG. 2, the electronic device 100 may include a microphone 110, a memory 120, and a processor 130.

The microphone 110 may receive a speech signal from a user. For example, the microphone 110 may receive the user speech for controlling the electronic device 100 from the plurality of speakers 10, 20, 30 shown in FIG. 1.

According to one embodiment, the microphone 110 may have a microphone array configuration composed of a plurality of microphones (e.g., four). A microphone array consisting of a plurality of microphones may estimate the direction in which a speech signal is input. According to one embodiment, the microphone array may be made of directional or omnidirectional microphones, or directional microphones and omnidirectional microphones may be mixed.

The memory 120 may store information on a speaker model corresponding to a plurality of speakers. The memory 120 may include speaker characteristics information for each phoneme of a plurality of speakers, frequency information of a speech signal of a plurality of speakers, or the like. The speaker characteristics information may include various information such as information on the body characteristics of the speaker such as the oral structure, length of neck, or the like, information on a speech signal by phonemes due to body characteristics of the speaker, information on the speaker's pronunciation habits, or the like.

The memory 120 may store various data for operation of the electronic device 100, such as a program for processing or control of the processor 130. The memory 120 may store a plurality of application programs or applications running on the electronic device 100, data or instructions for operation of the electronic device 100, or the like. At least some of the application programs may be downloaded from the external server 200 via wireless communication. At least some of the application programs may be present on the electronic device 100 from the release for a basic function of the electronic device 100. The application program may be stored in the memory 120 and driven to perform the operation (or function) of the electronic device 100 by the processor 130.

The memory 120 may be implemented as a non-volatile memory, a volatile memory, a flash memory, a hard disk drive (HDD), a solid state drive (SSD), or the like. The memory 120 is accessed by the processor 130 and reading/writing/modifying/deleting/updating of data by the processor 130 may be performed. In an example embodiment of the disclosure, the term "memory" may include the memory 120, a read-only memory (ROM) in the processor 130, a random access memory (RAM), or a memory card (for example, a micro secure digital (SD) card, and a memory stick) mounted to the electronic device 100.

The processor 130 may control the overall operation of the electronic device 100 using various programs stored in the memory 120. The processor 130 may identify a speaker model corresponding to the speech signal received through the microphone 110 of a plurality of speaker model stored in the memory 120. The processor 130, for each of the plurality of phonemes included in the received speech signal, when each phoneme is trained in the identified speaker model, may identify the change in the amount of speaker characteristics information included in the speaker model. The processor 130 may train the speaker model with data having great change of amounts of information based on the degree of change in amount of speaker characteristics information.

The detailed description of the processor 130 will be described in FIG. 4.

Figure 3:
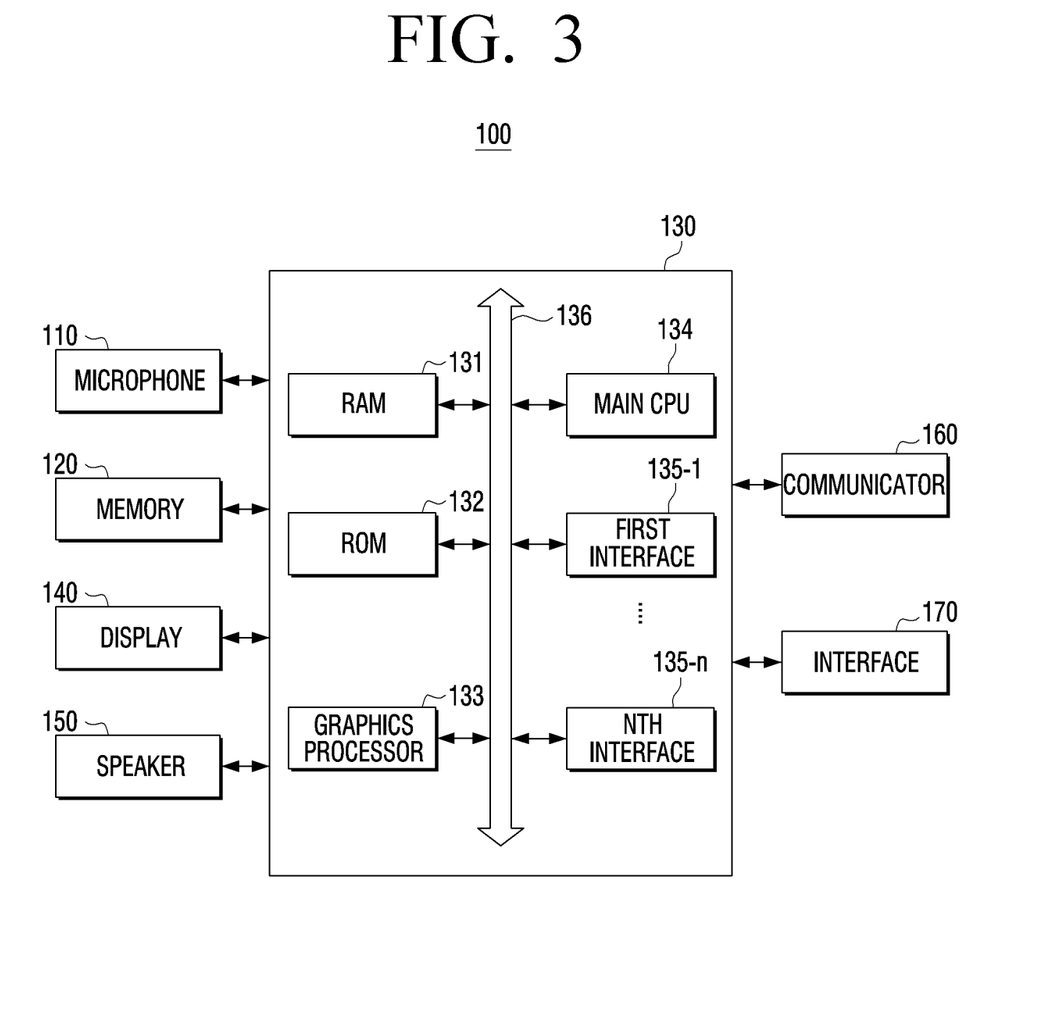
FIG. 3 is a detailed diagram illustrating a configuration of an electronic device according to an embodiment.

FIG. 3 is a detailed diagram illustrating a configuration of an electronic device according to an embodiment.

Referring to FIG. 3, the electronic device 100 100 may include the microphone 110, the memory 120, a display 140, a speaker 150, a communicator 160, an interface 170, and the processor 130 that is electrically coupled with the components described above. Since the microphone 110, the memory 120, and the processor 130 have already been described, a detailed description will be omitted.

The processor 130 controls overall operations of the electronic device 100 using various programs stored in the memory 120.

To be specific, the processor 130 includes at least one of a random access memory (RAM) 131, a read-only memory (ROM) 132, a graphics processer 133, a main central processing unit (CPU) 134, a first to $n^{th}$ interfaces 135-1-154-n, and a bus 136. The RAM 131, the ROM 132, the main CPU 134, the first to $n^{th}$ interfaces 135-1 to 135-n, or the like, may be interconnected through the bus 136.

The ROM 132 stores one or more instructions for booting the system and the like. When the turn-on instruction is input and power is supplied, the main CPU 134 copies the OS stored in the memory 120 to the RAM 131 according to the stored one or more instructions in the ROM 132, and executes the OS to boot the system. When the booting is completed, the main CPU 134 copies various application programs stored in the memory 120 to the RAM 131, executes the application program copied to the RAM 131, and performs various operations.

The graphics processor 133 may generate a screen including various objects such as icons, images, text, and the like using a calculator (not shown) and a renderer (not shown). Here, the calculator may calculate an attribute value such as a coordinate value, a shape, a size, and a color to be displayed by each object according to the layout of the screen based on the received control command from the communicator 160.

The main CPU 134 accesses the memory 120 and performs booting using an operating system (OS) stored in the memory 120, and performs various operations using various programs, contents data, or the like, stored in the memory 120.

The first to $n^{th}$ interface 135-1 to 135-n are connected to the various elements described above. One of the interfaces may be a network interface connected to an external device through the network.

The processor 130 according to an embodiment may be implemented with at least one of a digital signal processor (DSP), a microprocessor, and a time controller (TCON). The embodiment is not limited thereto and may include at least one of a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 130 may be implemented in a system on chip (SoC) type or a large scale integration (LSI) type in which a processing algorithm is built therein or in a field programmable gate array (FPGA) type.

The display 140 may display various screens generated by the graphics processor 133 to perform functions according to the speech commands recognized by the electronic device 100. The electronic device 100 may include the display 140 as a component, but when displaying various screens on the display included in the external device, may display various screens corresponding to the speech command on the display of the external device using the interface 170 to be described later.

The display 140 may be implemented as a liquid crystal display (LCD) panel, organic light emitting diodes (OLED), or the like, but is not limited thereto. The display 140 may also be implemented as a flexible display, a transparent display, or the like According to one embodiment, the display 140 may include a display panel for outputting an image, as well as a bezel housing the display panel. According to one embodiment, the bezel may include a touch detection (not shown) for detecting a user interaction.

The speaker 150 may output various alarm sound or speech messages as well as various audio data. The speaker 150 may output an alarm when the speaker model corresponding to the speaker inputting the speech is identified.

The communicator 160 is a configuration for communicating with the external server 200. The communicator 160 may transmit a digital conversion signal for the input speech signal to the external server 200. The communicator 160 may receive the result performed by the external server 200, for example, the speaker characteristics information obtained by analyzing the phoneme included in the speech signal.

The communicator 160 may communicate with other external devices. The type of the external device may be an electronic device capable of outputting image content. For example, if the external device is a television, the type of the external device is a video device, and the output data information of the television may include, but is not limited to, a model name of the television, an audio characteristic of the output content of the television, a frequency characteristic of the output audio of the television output content, etc. The external device with which the communicator 160 communicates may include a remote controller, a bluetooth speaker, a lighting device, a smart cleaner, a smart refrigerator, an Internet of Things (IoT) home manager, etc., in addition to a device capable of outputting image content, When communicating with an external device including a microphone, the communicator 160 may receive information on a speech signal of a speaker received by an external device. The communicator 160 may receive a speech command of a user inputted through a remote controller. The communicator 160 may also receive a speech signal of a speaker received through a speaker included in the remote controller. This is only one embodiment, and the communicator 160 may receive a remote control signal through a Bluetooth (BT) module.

The communicator 160 may include a communication module for at least one communication methods such as wireless fidelity (WI-FI), a bluetooth (BT), a near field communication (NFC), global positioning system (GPS), Ethernet through carrier sense multiple access/collision detection (CSMA/CD), or cellular communication (for example, for example: long term evolution (LTE), long term evolution-advanced (LTE-A), code division multiple access (CDMA), wideband code division multiple access (WCDMA), universal mobile telecommunications system (UMTS), wireless broadband internet (Wibro) or global system for mobile communications (GSM), etc.). The communicator 160 may be implemented as a plurality of communicators corresponding to at least one communication module.

According to one embodiment, the communicator 160 may use a Wi-Fi module to communicate with an external device such as a remote controller and the external server 200. Alternatively, when the communicator 160 is implemented with a plurality of communicators, the communicator 160 may use a communicator including at least one of an Ethernet modem and a WiFi module for communicating with the external server 200 and may use a communicator including a BT module to communicate with an external device such as a remote controller. However, this is only one embodiment and is not limited thereto.

The interface 170 is a configuration for connecting an external device and the electronic device 100 to input and output video and audio. Specifically, the interface 170 may include at least one of a universal serial bus (USB), a high definition multimedia interface (HDMI), a recommended standard 232 (RS-232), a plain old telephone service (POTS) DVI, DP, Thunderbolt, or the like, for wired communication. The HDMI is a high performance data transmission interface for an audio and video (AV) device which outputs audio and video. DP is an interface capable of realizing ultra-high resolution screen such as 2560×1600 or 3840×2160, 3D stereoscopic image as well as 1920×1080 full HD, and also delivering digital voice. Thunderbolt is an input and output interface for high-speed data transmission and connection, and may connect PC, display, and storage devices all in a single port.

The input and output terminals described above are merely exemplary, and the interface 170 may include a port to output an audio signal only or a port to output a video signal only.

Figure 4:
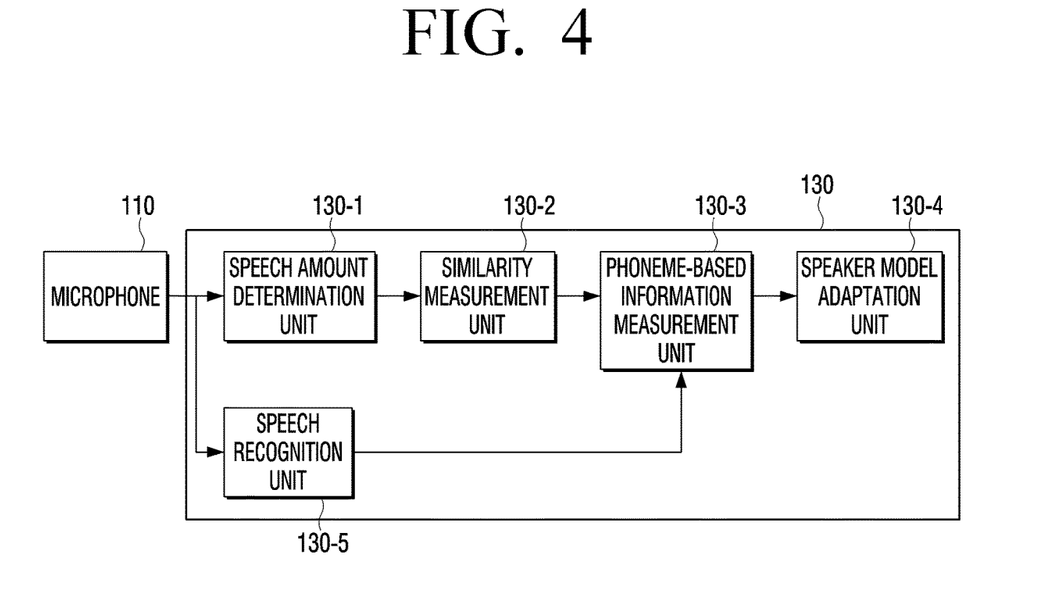
FIG. 4 is a detailed diagram illustrating a specific configuration of a processor according to an embodiment.

FIG. 4 is a detailed diagram illustrating a specific configuration of a processor according to an embodiment.

Referring to FIG. 4, the processor 130 may include a speech amount determination unit 130-1, a similarity measurement unit 130-2, a phoneme-based information measurement unit 130-3, a speaker model adaptation unit 130-4, and a speech recognition unit 130-5.

The speech amount determination unit 130-1 may measure the length of the accumulated signal of the speech signal input through the microphone 110. The speech amount determination unit 130-1 may identify whether the accumulated duration of a particular speech signal is greater than or equal to a predetermined duration, and may transmit only the speech signal longer than the preset reference duration to the similarity measurement unit 130-2.

The similarity measurement unit 130-2 may identify whether the inputted speech is similar to the information included in the plurality of speaker models stored in the memory 120. The similarity measurement unit 130-2 may obtain a frequency signal corresponding to the input speech signal and may compare the frequency signal with respect to each speech included in the plurality of speaker models. The similarity measurement unit 130-2 may identify a speaker model including frequency information having highest similarity with frequency information of an inputted speech signal, among a plurality of speaker models.

The phoneme-based information measurement unit 130-3 may identify a change in the amount of speaker characteristics information included in the speaker model when each of the phonemes is adapted to the identified speaker model based on each of the phonemes included in the speech signal transmitted from the speech recognition unit 130-5.

The phoneme-based information measurement unit 130-3 may identify whether the amount of speaker characteristics information is increased by using a Bayesian information criterion (BIC) for each of the separated phonemes. The BIC is an indicator for measuring the change in the information amount of the trained model by a Gaussian process. The value of the BIC (Pi) value being greater than zero may refer that when a phoneme including phoneme information Pi is input to a current speaker model, the amount of information representing the speaker characteristics included in the speaker model is increased.

The speaker model adaptation unit 130-4 may identify a phoneme to adapt to the speaker model based on the value of the BIC (Pi) identified in the phoneme-based information measurement unit 130-3. The speaker model adaptation unit 130-4 may identify all the phonemes of which the BIC (Pi) value is greater than a preset value as data to be adapted or a phoneme having a greatest BIC (Pi) value as data to be adapted.

The speech recognition unit 130-5 is configured to recognize a speech signal inputted through the microphone 110.

The speech recognition unit 130-5 may perform a speech to text (STT) process for a speech signal. The speech recognition unit 130-5 may perform a grapheme-to-phoneme conversion for the speech signal converted to a text as a result of performing speech recognition. The grapheme-to-phoneme conversion is a method of generating a phoneme row from a spelling of a text, and the speech recognition unit 130-5 may perform grapheme-to-phoneme conversion before and after performing the automatic speech recognition process that converts speech into text.

The speech recognition unit 130-5 may be included in the processor 130 in the electronic device 100 as illustrated in FIG. 4, and may be implemented with a configuration separate from the processor 130. The speech recognition unit 130-5 may be included in the external user 200. If the speech recognition unit 130-5 is included in the external server 200, the electronic device 100 may convert the speech signal input through the communicator 160 to a digital signal and transmit the signal, and may receive the speech recognition result.

Figure 5:
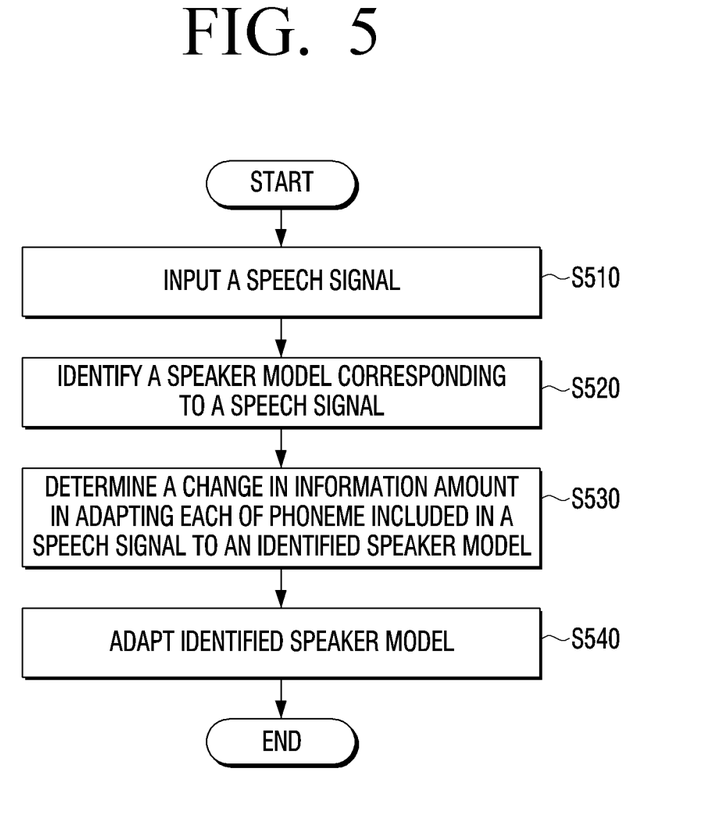
FIG. 5 is a block diagram illustrating a method for adapting a speaker model based on a change in an amount of speaker characteristics information determined with a phoneme unit according to an embodiment.

FIG. 5 is a block diagram illustrating a method for adapting a speaker model based on a change in an amount of speaker characteristics information determined with a phoneme unit according to an embodiment.

Referring to FIG. 5, the electronic device 100 of the disclosure may receive a speech signal from a user in operation S510. The electronic device 100 may be in a situation where a speech signal is received from a plurality of speakers. The electronic device 100 may include a plurality of speaker models which are registered by a plurality of speakers. The speaker model may include the speaker characteristics information for each speaker. The speaker characteristics information may include information about the body characteristic information of a speaker, such as the mouth structure, the length of the neck, or the like, and the pronunciation characteristic information of the speaker, such as a pronunciation habits for a particular phoneme, or the like.

The electronic device 100 may identify a speaker model corresponding to a speech signal inputted from a plurality of speaker models in operation S520. The electronic device 100 may include frequency information of a speech signal corresponding to each speaker model. The electronic device 100 may obtain the frequency information of the input speech signal and compare with the frequency information which a plurality of speaker models include. The electronic device 100 may compare the frequency information to identify the similarity, and may identify the speaker model having a high similarity as a speaker model corresponding to the input speech signal.

The electronic device 100 may identify a change amount of information included in a speaker model when each phoneme is input for each of a plurality of phonemes included in the input speech signal in operation S530. The electronic device 100 may identify whether new speaker characteristic information not included in the existing speaker model may be obtained as a result of a combination of the newly obtained phoneme and the phoneme already included in the speaker model. A detail thereof will be described with reference to FIG. 6.

The electronic device 100 may identify a phoneme to maximize the amount of speaker characteristics information included in the speaker model when the phoneme obtained is input to the speaker model among the newly obtained phonemes, as a result of the identification of the amount of change of information. The electronic device 100 may train the speaker model by using a phoneme that maximizes the amount of speaker characteristics information.

The electronic device 100 may identify at least one phoneme that increases the amount of speaker characteristics information included in the speaker model by a predetermined criterion or more, when the phoneme is input to the identified speaker model, among the newly obtained speaker models. The electronic device 100 may train the speaker model using the identified at least one phoneme in operation S540.

Figure 6:
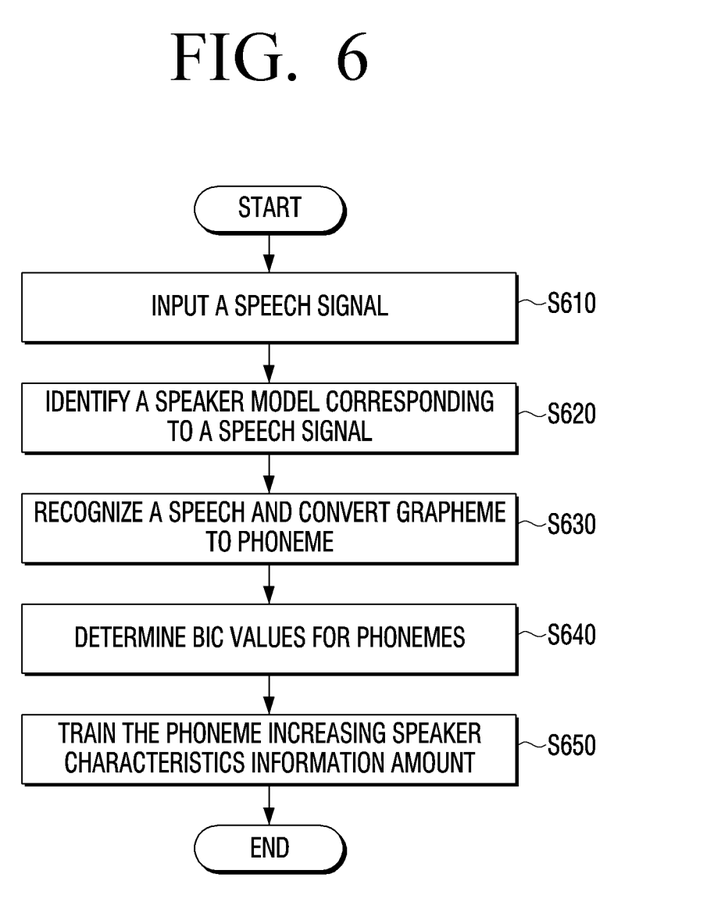
FIG. 6 is a diagram illustrating adapting a speaker model by determining by an electronic device a change in an amount of information of a speaker model when inputting each phoneme included in an input speech to a speaker model according to an embodiment.

FIG. 6 is a diagram illustrating adapting a speaker model by determining by an electronic device a change in an amount of information of a speaker model when inputting each phoneme included in an input speech to a speaker model according to an embodiment.

Referring to FIG. 6, the electronic device 100 may receive a speech in operation S610, and may identify a speaker model corresponding to the speech signal among the plurality of speaker models in operation S620.

The electronic device 100 may perform speech recognition with respect to the input speech signal. The electronic device 100 may perform the STT process for speech recognition. The electronic device 100 may perform grapheme-to-phoneme conversion in operation S630 for a speech signal converted to text as a result of speech recognition in operation S630. The grapheme-to-phoneme conversion is a method of generating a phoneme column from the spelling of text, and the electronic device 100 may perform grapheme-to-phoneme conversion before and after performing the automatic speech recognition process of converting speech into text. The electronic device 100 may perform grapheme-to-phoneme conversion by applying phoneme rules or modeling pronunciations inside a syntactic word with each syntactic word of a text as a basic unit, but is not limited thereto.

As described above, the electronic device 100 may perform speech recognition directly with respect to the input speech, or may perform speech recognition through the external server 200. When performing speech recognition on the external server 200, the electronic device 100 may convert the inputted speech signal into a digital signal and transmit the converted speech signal to the external server 200. The external server 200 may transmit the result of performing the STT to the electronic device 100 based on the received signal.

The external server 200 may be a server performing speech recognition, but may be a server performing grapheme-to-phoneme conversion. When the external server 200 performs grapheme-to-phoneme conversion, the electronic device 100 may receive the grapheme-to-phoneme conversion result of the speech recognition data by the external server 200. The server performing speech recognition and the grapheme-to-phoneme conversion server may be implemented as the same server or may be implemented as a separate server.

The electronic device 100 may separate the data which is obtained by converting the speech signal into syllables, and may separate the separated syllable into a phoneme using a characteristic variable. The electronic device 100 may divide and separate a section of the phoneme included in the speech signal by using at least one of the energy, the zero crossing rate, and the spectral energy ratio of each frame of the speech signal.

The electronic device 100 may identify whether the amount of speaker characteristics information is increased by the separated phonemes through the BIC. The BIC is an indicator to measure the change in the amount of information of the trained model by the Gaussian process.

The BIC ($P_i$) may refer to the BIC value of the phoneme and may be defined as shown below:

$$BIC(P_i) = I(P_i, M_n) - I(P_i | M_n) - I(M_n) - \delta_i$$

$I(P_i, M_n)$: the amount of speaker characteristics information when applying the phoneme to the existing speaker model $I(P_i | M_n)$: the amount of speaker characteristics information for the phoneme already included in the existing speaker model $I(M_n)$: the amount of speaker characteristics information of the existing speaker model $\delta_i$: bias term for overlapped information amount Information quantity $I(.)$ is an entropy value for each variable, in which the speaker characteristics are modeled using a Gaussian model, and may be calculated using a likelihood value used for the speaker model similarity measurement.

The BIC ($P_i$) value being greater than 0 may indicate that, when a phoneme having phoneme information $P_i$ is input in the current speaker model, the amount of information indicating the speaker characteristics included in the speaker model has increased.

If the electronic device 100 already includes information about the phoneme obtained from the speech signal inputted to the speaker model, the BIC value relative to the obtained phoneme may be obtained by reducing the entropy value for the amount of speaker characteristics information included in the speaker model from the entropy value for the amount of speaker characteristics information when the speaker model is trained with obtained phoneme, the entropy value for the amount of speaker characteristics information for the phoneme included in the speaker model, and the entropy value for the overlapped information amount of the phoneme.

Alternatively, when the electronic device 100 does not include information about the phoneme obtained in the speech signal inputted to the speaker model, the electronic device 100 may reduce the entropy value for the amount of speaker characteristics information included in the speaker model from the entropy value for the amount of speaker characteristics information when the phoneme obtained in the speaker model is trained, to obtain the BIC value.

The electronic device 100 may identify the characteristics of the speech signal input from the speaker at a predetermined time interval. For example, the electronic device 100 may identify whether an amount of information is increased when the speaker model is trained with the corresponding phoneme by analyzing the phoneme information included in the speech signal by every 20 ms of time.

The electronic device 100 may calculate a BIC (Pi) value for all phonemes, and may determine whether to adapt or train the speaker model with a particular phoneme. The electronic device 100 may train the speaker model by using only the phoneme having the highest value of the BIC (Pi), or train the speaker model by using at least one of the phoneme having a value of the BIC (Pi) greater than or equal to the preset value in operation S650.

Figure 7:
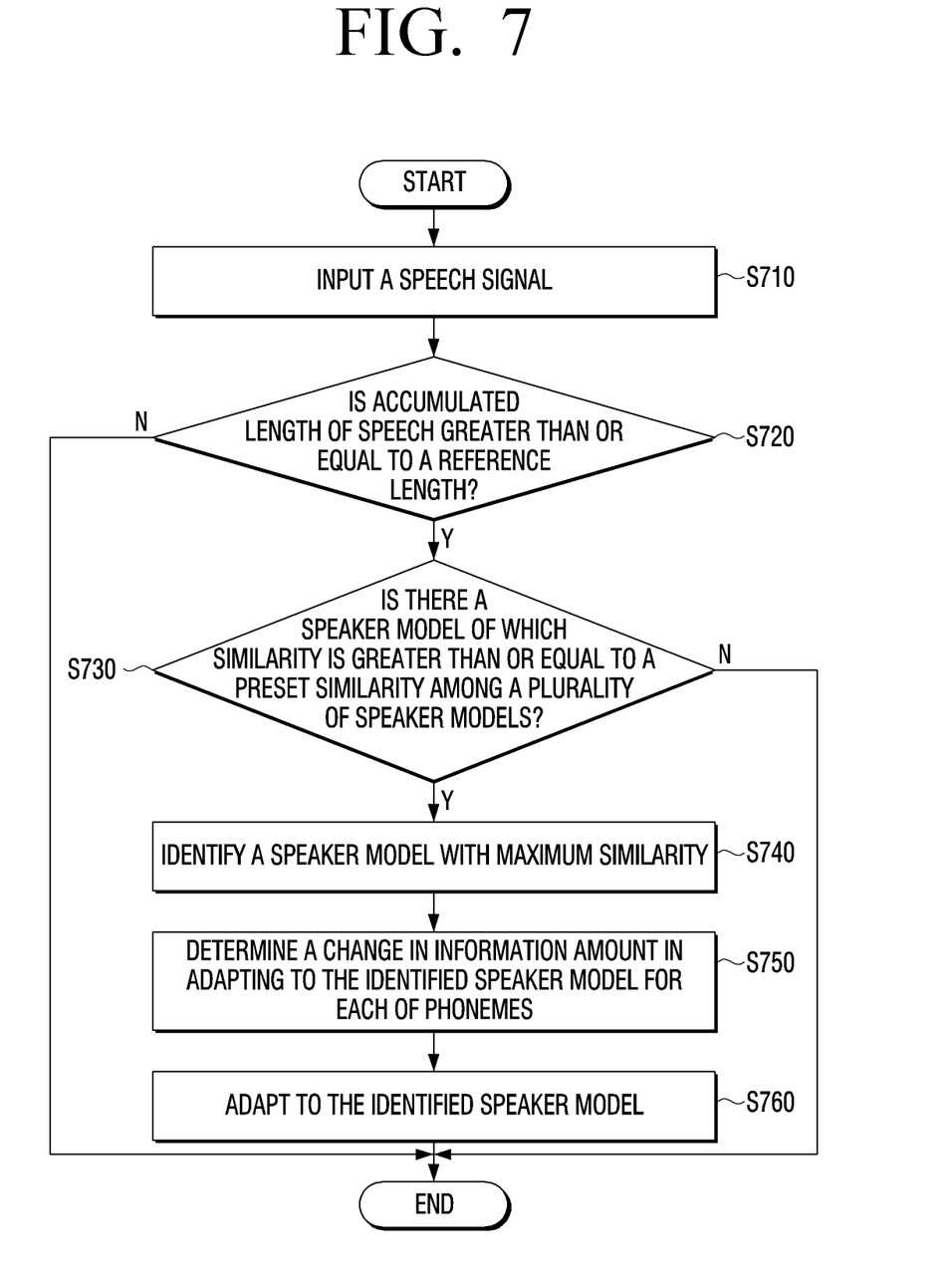
FIG. 7 is a diagram illustrating identifying a speaker model corresponding to the input speech signal according to an embodiment.

FIG. 7 is a diagram illustrating identifying a speaker model corresponding to the input speech signal according to an embodiment.

Referring to FIG. 7, the electronic device 100 may receive a speech signal input in operation S710. If the accumulated duration for the input speech signal is shorter than the preset duration in operation S720-N, the electronic device 100 may store the speech signal in the memory 110 or a buffer. The electronic device 100 may obtain frequency information for the input speech signal when the accumulated duration for the input speech signal is longer than the preset duration in operation S720-Y.

The electronic device 100 may compare the frequency information for the input speech signal and frequency information included in each of a plurality of speaker models to measure the similarity between the frequency signals. If there is no frequency information of which similarity with the frequency information for the input speech signal is greater than the preset similarity, among frequency information included in a plurality of speaker models in operation S730-N, the electronic device 100 may identify that there is no speaker model for a speaker of the input speech.

The electronic device 100 may identify the frequency information having the greatest similarity with the frequency information for the input speech signal among each of the frequency information included in the plurality of speaker models, and may identify the corresponding speaker model as a speaker model corresponding to the inputted speech signal in operation S740.

As illustrated in FIG. 6, the electronic device 100 may identify a change in the amount of speaker characteristics information included in the speaker model in adapting or training on the speaker model identified for each of the phonemes by using the BIC index (indicator) as described in FIG. 6 in operation S750, and may adapt or train the phoneme determined according to the identification result in operation S760.

While one or more embodiments have been described with reference to the figures, it will be understood by those of ordinary skill in the art that various changes in form and details may be made therein without departing from the spirit and scope as defined by the following claims and their equivalents.

What is claimed is:

1. A method of controlling an electronic device, the method comprising:
   receiving a speech signal from a user;
   identifying a speaker model corresponding to the speech signal among a plurality of speaker models;
   determining changes in an amount of speaker characteristics information of the speaker model based on each of the phonemes being inputted in the identified speaker model for each of a plurality of phonemes included in the speech signal; and
   training the identified speaker model using at least one of the plurality of phonemes based on the result of determining.

2. The method of claim 1, wherein the training further comprises:
   based on a phoneme being inputted to the identified speaker model among the plurality of phonemes, identifying a phoneme that increases the amount of speaker characteristics information of the speaker model to the maximum; and
   training the identified speaker model using the identified phoneme.

3. The method of claim 1, wherein the training further comprises:
   based on a phoneme being inputted to the identified speaker model among the plurality of phonemes, identifying at least one phoneme that increases the amount of speaker characteristics information of the speaker model by a preset criterion or more; and
   training the identified speaker model using the at least one identified phoneme.

4. The method of claim 1, wherein the determining changes of information relative to the speaker model further comprises:
   obtaining text data corresponding to the speech signal; and
   identifying the phoneme included in the speech signal by performing grapheme-to-phoneme conversion and a phoneme section segmentation based on the text data.

5. The method of claim 4, wherein the determining the changes comprises:
   based on the information on the identified phoneme being included in the speaker model, determining an index for the identified phoneme by reducing an entropy value for the amount of speaker characteristics information included in the speaker model, an entropy value for the amount of speaker characteristics information for the phoneme included in the speaker model, and an entropy value for overlapped information amount of the phoneme, from an entropy value for the amount of speaker characteristics information when the speaker model is trained with obtained phoneme, and
   based on the information about the identified phoneme not included in the speaker model, determining an index for the identified phoneme by reducing an entropy value for the amount of speaker characteristics information included in the speaker model from the entropy value for the amount of speaker characteristics information when the speaker model is trained with the identified phoneme.

6. The method of claim 5, wherein the index is a Bayesian information criterion (BIC) for the amount of speaker characteristics information modeled using a Gaussian model.

7. The method of claim 1, wherein the receiving comprises receiving a plurality of speech signals from a plurality of users, and
   wherein the identifying the speaker model further comprises identifying a speech signal of which an accumulated signal length exceeds a preset reference length after being inputted, from among the plurality of speech signals, and
   wherein the identifying comprises identifying a speaker model corresponding to the identified speech signal.

8. The method of claim 1, wherein the identifying the speaker model comprises identifying a speaker model of which a similarity with the input speech signal exceeds a preset similarity, among the plurality of speaker models.

9. An electronic device comprising:
a microphone; and
a processor configured to:
identify a speaker model corresponding to a speech signal inputted through the microphone among a plurality of speaker models,
determine changes in an amount of speaker characteristics information of the speaker model based on each of the phonemes being inputted in the identified speaker model for each of a plurality of phonemes included in the speech signal, and
train the identified speaker model using at least one of the plurality of phonemes based on the result of determining.

10. The electronic device of claim 9, wherein the processor is further configured to:
based on a phoneme being inputted to the identified speaker model among the plurality of phonemes, identify a phoneme that increases the amount of speaker characteristics information of the speaker model to the maximum; and
train the identified speaker model using the identified phoneme.

11. The electronic device of claim 9, wherein the processor is further configured to:
based on a phoneme being inputted to the identified speaker model among the plurality of phonemes, identify at least one phoneme that increases the amount of speaker characteristics information of the speaker model by a preset criterion or more, and train the identified speaker model using the at least one identified phoneme.

12. The electronic device of claim 9, wherein the processor is further configured to obtain text data corresponding to the speech signal and identify the phoneme included in the speech signal by performing grapheme-to-phoneme conversion and a phoneme section segmentation based on the text data.

13. The electronic device of claim 12, wherein the processor is further configured to:
based on the information on the identified phoneme being included in the speaker model, determine an index for the identified phoneme by reducing an entropy value for the amount of speaker characteristics information included in the speaker model, an entropy value for the amount of speaker characteristics information for the phoneme included in the speaker model, and an entropy value for overlapped information amount of the phoneme, from an entropy value for the amount of speaker characteristics information when the speaker model is trained with obtained phoneme, and
based on the information about the identified phoneme not included in the speaker model, determine an index for the identified phoneme by reducing an entropy value for the amount of speaker characteristics information included in the speaker model from the entropy value for the amount of speaker characteristics information when the speaker model is trained with the identified phoneme.

14. The electronic device of claim 13, wherein the index is a Bayesian information criterion (BIC) for the amount of speaker characteristics information modeled using a Gaussian model.

15. The electronic device of claim 9, wherein the processor is further configured to identify a speech signal of which an accumulated signal length exceeds a preset reference length after being inputted, from among the plurality of speech signals, and identify a speaker model corresponding to the identified speech signal.

* * * * *